United States Patent [19]

Carey et al.

[11] Patent Number: 4,540,503

[45] Date of Patent: Sep. 10, 1985

[54] METHOD FOR CONTROLLING THE VISCOSITY OF SILOXANE OILS

[75] Inventors: A. Andrew Carey, Lenoir City; Joel T. Shor, Oak Ridge, both of Tenn.

[73] Assignee: The United States of America as represented by the United States Department of Energy, Washington, D.C.

[21] Appl. No.: 649,623

[22] Filed: Sep. 12, 1984

[51] Int. Cl.$^3$ ............................................. C09K 5/00
[52] U.S. Cl. .................................. 252/78.3; 252/75; 252/397; 252/399; 252/400 R; 252/404; 252/407
[58] Field of Search ............ 252/397, 398, 399, 400.1, 252/404, 381, 382, 383, 384, 400.3, 400.31, 400.51, 407, 74, 75, 78.3

[56] References Cited

U.S. PATENT DOCUMENTS

| | | | |
|---|---|---|---|
| 3,189,548 | 6/1965 | Wilson et al. | 252/78.3 |
| 3,328,301 | 6/1967 | Thompson et al. | 252/404 |
| 3,720,611 | 3/1973 | Britt | 252/75 |

Primary Examiner—Paul Lieberman
Assistant Examiner—Hoa Van Le
Attorney, Agent, or Firm—Katherine P. Lovingood; Stephen D. Hamel; Judson R. Hightower

[57] ABSTRACT

This invention relates to a method of controlling the viscosity of siloxane oils in the presence of lead by adding a small amount of a dione such as p-benzoquinone or 2,3-butanedione.

3 Claims, No Drawings

METHOD FOR CONTROLLING THE VISCOSITY OF SILOXANE OILS

This invention relates to a method of controlling the viscosity of siloxane oils used as damper fluids, particularly polydimethylsiloxane, in the presence of lead. It is a result of a contract with the United States Department of Energy.

BACKGROUND OF THE INVENTION

The process of gas centrifugation is used in the separation of isotopic mixtures of uranium. In the operation of gas centrifuge machines it is vital that vibrations occurring in all components be absolutely minimized since any vibration might be amplified to catastrophic proportions, resulting in substantial and sometimes irreparable damage to the machines. Therefore, it is very important that great care be taken to balance the centrifuge rotor as it is brought to speed and to provide sufficient damping to quiet vibrations in the machine.

One damping technique utilizes a lead pendulum mass suspended by a cable in a sealed container filled with polydimethylsiloxane (PDMS) oil. Although this technique satisfactorily controls vibrations of the damped member, after extended use severe problems arise including mechanical instabilities and vibrations which render the machines inoperable and, on occasion, damage them beyond repair. Studies have disclosed that changes in the viscosity of the damping fluid assembly were causing the instability. Whereas the initial viscosity was adequate to quell detrimental vibrations, extended use caused the damping fluid to thicken to such an extent that it was no longer sufficiently damped vibrations.

Studies have been done on the breakdown of polysiloxanes in the hard state caused by both ultrasonic and mechanical forces while in the presence of red lead ($Pb_3O_4$). The mechanism of this breakdown process was studied by adding quinone (p-benzoquinone) as a free radical inhibitor. The proportion of the crosslinked product that results from the breakdown was partially reduced upon adding quinone in proportions of up to 2% of the polymer mass. It was proposed that cross linking of PDMS oil could be responsible for the viscosity increase. However, even if crosslinking were the cause of the viscosity increase, the prior use of quinone with PDMS in the hard state and red lead to study ultrasonic and mechanical breakdown would not lead one to conclude that quinone would fully inhibit crosslinking of the PDMS oil in the liquid state in the presence of pure lead where no ultrasonic or mechanical processes are occurring. However, tests with quinone gave positive results and led the way to this invention.

SUMMARY OF THE INVENTION

In view of the problems set forth above, it is an object of this invention to provide a method for inhibiting the change in viscosity of PDMS oils when in the presence of heavy metals.

It is another object of this invention to provide a method for inhibiting the increase in viscosity of PDMS oils when in the presence of lead.

It is another object of this invention to prolong the life of centrifuges.

In furtherance of these objectives, this invention is a method for controlling the viscosity of PDMS oils in the presence of lead. Simply stated, this is done by adding a small amount of a dione to the PDMS oil corresponding to from 0.1 to 0.2 percent by weight of the PDMS oil.

The damper fluid used in the centrifuges is polydimethylsiloxane oil although the method could be effective for other siloxanes as well.

The diones used in tests were quinone and 2,3-butanedione and mixtures of the two but other diones could be used to achieve similar results.

The metal present in the tests was lead. However, if a viscosity change of PDMS oils results when brought in contact with heavy metals other than lead, it is expected that treating the PDMS oils with a small amount of dione would inhibit the change in the same manner as in the case for lead.

DETAILED DESCRIPTION OF THE PREFERRED EMBODIMENT

The invention is a method for controlling the viscosity of PDMS oils in the presence of lead. This is done by adding a small amount of a dione to the PDMS oil.

According to a preferred embodiment of the invention, quinone or 2,3-butanedione or a mixture of the two is added to the PDMS oil in an amount corresponding from 0.1 to 0.2 percent by weight of PDMS, the preferred addition comprising a mixture of 0.1 percent quinone and 0.1 percent 2,3-butanedione. Prior to adding these diones, they should be dried, and the PDMS oil should be shielded from light.

Example

Tests were done on PDMS oil without the addition of diones with and without lead being present, and in the presence of lead with dione addition to PDMS oil in accordance with the invention. The diones were in amounts corresponding to 0.1 percent quinone and 0.1 percent 2,3-butanedione by weight of the PDMS oil. Care was taken to avoid exposure of the reactants to moisture and light. The testing involved heating the PDMS alone, with lead, and with lead and diones to about 185° F. for a prolonged period of time while periodically testing the PDMS oil for changes in viscosity.

To prepare the PDMS oil with diones added for viscosity control, quinone was added to an opaque container holding PDMS oil and the container placed in a 425-watt ultrasonic bath consisting of a 5 centistoke viscosity siloxane oil where it was agitated for two hours. (The use of the ultrasonic bath was to promote mixing, not to study ultrasonic breakdown. Ultrasonic breakdown was not the cause of the viscosity change since the viscosity of the PDMS oil increases when merely in the presence of lead with no other contributing factors involved and also no ultrasonic frequencies are present in the centrifuge.) At the same time the PDMS-quinone mixture was mechanically stirred and the reaction vessel was purged with dry inert gas. At the end of two hours the mixture was removed from the bath and the 2,3-butanedione was added. This solution was mechanically mixed for an additional 15 to 20 minutes while purging with dry inert gas.

To test the PDMS oil in the presence of lead, lead coupons were immersed in the PDMS oil (both with and without diones added, depending on the test). These components were heated to about 185° F. and held at this temperature for a prolonged period of time. Samples were taken periodically to test for changes in viscosity.

The results of tests done on two lots of PDMS oil acquired from two different manufacturers and are shown in the table below. Viscosity is expressed in centistokes (cs).

| Source Of PDMS Oil | PDMS Oil Alone | | PDMS Oil In Presence of Pure Lead | | PDMS Oil With Diones In Presence Of Pure Lead | |
|---|---|---|---|---|---|---|
| | Viscosity Change, cs | Test Time, Hr. | Viscosity Change, cs | Test Time, Hr. | Viscosity Change, cs | Test Time, Hr. |
| LOT 1 | 0 | 163 | 25 | 163 | 5 | 522 |
| | | | 18 | 122 | | |
| | | | 29 | 163 | | |
| LOT 2 | 0 | 163 | 168 | 252 | 4 | 522 |
| | | | 66 | 163 | | |
| | | | 134 | 163 | | |
| | | | 89 | 252 | | |

As shown in the table above, there was a significant decrease in the viscosity change in the PDMS oil when treated with the dione inhibitors. Similar results were noted when quinone or 2,3-butanedione were used alone. The mechanism for the reaction causing the viscosity change is not known. It is postulated that the viscosity change could be a result of a free radical mechanism between lead and PDMS oil since quinone is a known free radical scavanger. Another hypothesis is that lead oxide could cause the viscosity increase by reacting with the PDMS oil, in which case using a chelating agent (which encloses the metal cation thus reducing the free concentration of active metal cations) such as 2,3-butanedione would successfully inhibit the reaction. However, this is speculation and the actual mechanism remains in question.

In operation this 0.1 percent quinone to 0.1 percent 2,3-butanedione mixture in an actual centrifuge damper assembly has proven most successful and the centrifuge has been continuously operating for almost a year without a significant viscosity change. Siloxane oils are commonly used in the presence of heavy metals other than lead. If viscosity changes result from such uses, then this invention could prove very beneficial as a solution to these types of problems.

We claim:

1. A method for controlling the viscosity of siloxane oils in the presence of lead comprising adding an amount of a dione corresponding to from about 0.1 to 0.2 percent by weight of the siloxane oil.

2. The method of claim 1 wherein said dione is selected from a group comprising a hydrocarbon ring or a straight chain hydrocarbon wherein the oxygens of said dione are located on adjacent carbons or on carbons separated by one, two or three carbons.

3. The method of claim 1 wherein said siloxane oil is polydimethylsiloxane and said dione is selected from the group comprising p-benzoquinone, 2,3-butanedione and mixtures thereof.

* * * * *